US007231509B2

(12) United States Patent
Gheith et al.

(10) Patent No.: US 7,231,509 B2
(45) Date of Patent: Jun. 12, 2007

(54) EXTENDED REGISTER BANK ALLOCATION BASED ON STATUS MASK BITS SET BY ALLOCATION INSTRUCTION FOR RESPECTIVE CODE BLOCK

(75) Inventors: Ahmed Gheith, Round Rock, TX (US); James Lyle Peterson, Austin, TX (US); Richard Ormond Simpson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 11/034,559

(22) Filed: Jan. 13, 2005

(65) Prior Publication Data

US 2006/0155911 A1 Jul. 13, 2006

(51) Int. Cl.
*G06F 9/34* (2006.01)
(52) U.S. Cl. ...................... 712/208; 712/228
(58) Field of Classification Search ............. None
See application file for complete search history.

(56) References Cited

U.S. PATENT DOCUMENTS

| 5,857,103 | A  | * | 1/1999 | Grove ......................... 717/158 |
| 5,926,646 | A  | * | 7/1999 | Pickett et al. ................. 712/32 |
| 6,456,891 | B1 | * | 9/2002 | Kranich et al. ................ 700/2 |
| 6,625,724 | B1 | * | 9/2003 | Kahn et al. .................. 712/229 |
| 6,877,084 | B1 | * | 4/2005 | Christie ...................... 712/203 |
| 2004/0003208 | A1 | * | 1/2004 | Damron ...................... 712/225 |
| 2004/0049657 | A1 | * | 3/2004 | Kling ......................... 712/208 |

* cited by examiner

*Primary Examiner*—Kenneth S. Kim
(74) *Attorney, Agent, or Firm*—Casimer K. Salys; Dillon & Yudell LLP

(57) ABSTRACT

An extended register processor includes a register file having a legacy register set and an extended register set. The extended register set includes a plurality of extended registers accessible only to extended register instructions. The processor maps extended register references to physical extended registers at run time. The processor includes a configurable extended register mapping unit to support this functionality. The mapping unit is accessible to an instruction decoder, which detects extended register references and forwards them to the mapping unit. The mapping unit returns a physical extended register corresponding to the extended register reference in the instruction. The mapping unit is configurable so that, for example, the mapping is specific to a code block. An extended register allocation instruction causes the processor to allocate a portion of the extended register set to the code block in which the declaration is located and to configure the mapping unit to reflect the allocation.

15 Claims, 7 Drawing Sheets

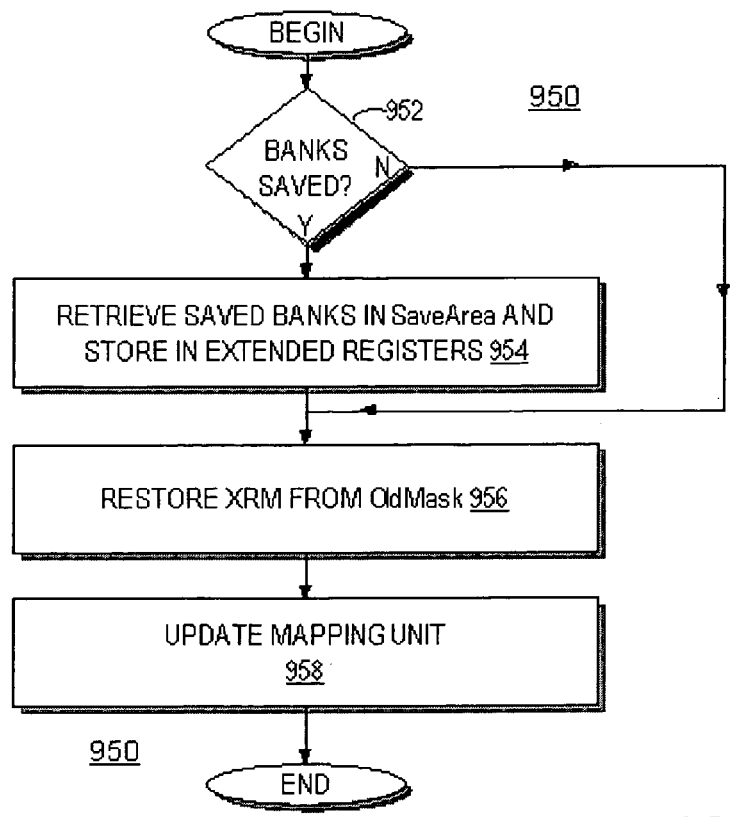
FIG. 10
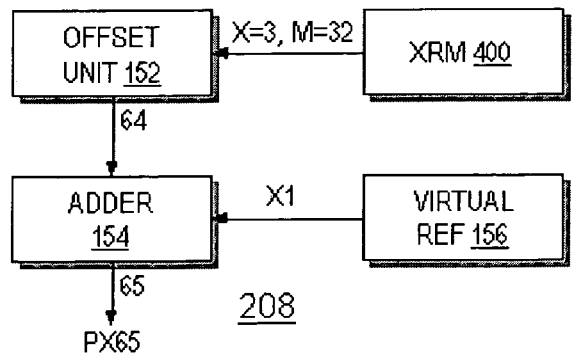
FIG. 8
FIG. 11

EXTENDED REGISTER BANK ALLOCATION BASED ON STATUS MASK BITS SET BY ALLOCATION INSTRUCTION FOR RESPECTIVE CODE BLOCK

The invention was made with Government support under contract NBCH020056. THE GOVERNMENT HAS CERTAIN RIGHTS IN THIS INVENTION.

BACKGROUND

1. Field of the Present Invention

The present invention is in the field of microprocessors and, more particularly, microprocessors employing extended register sets.

2. History of Related Art

Microprocessors (processors) generally have a set of general purpose registers available to programmers. General purpose -registers store values that are used in arithmetic instructions, branch instructions, and memory access (load/store) instructions. The number of general purpose registers included in a processor design reflects a trade off between performance, which benefits from a large number of general purpose registers, and factors such as cost, complexity, and die size (the physical size of the processor), which benefit from fewer general purpose registers.

After a processor's architecture (including the number of general purpose registers) is defined, programmers develop software based on the defined architecture. As a body of such software comes into existence, compatibility considerations make it impracticable to alter the fundamental processor architecture. More specifically, existing code needs to be executable, preferably without recompilation, by all subsequent revisions of a processor.

Despite the concern with compatibility, some complex applications would benefit from having access to a larger number of general purpose registers. Accommodating such applications is difficult because a processor's instruction set generally restricts the number of general purpose registers that are accessible. For example, the instruction set for a processor having 32 general purpose registers usually includes 5-bit field(s) for referencing registers. A 5-bit register field is limited to addressing 32 registers. Accordingly, enabling applications to access a greater number of registers, while maintaining compatibility with existing code, generally requires an extended register set and an extended instruction set. An extended register set is a set of registers not addressable by a processor's legacy instruction set, but which may be accessible using instruction set extensions (e.g., instruction prefixes).

As the number of extended registers increases, context switching becomes a significant performance consideration. In a conventional extended register set implementation, context switching is achieved by saving the entire extended register set to memory as part of a code block's state. While this approach is simple, it becomes more time consuming and expensive as the number of extended registers increases.

In addition, conventional extended register set implementations do not have a compiler-independent mechanism (i.e., a run time mechanism) for allocating extended registers among different code blocks. Independent (separately compiled) code blocks are unaware of which, if any, extended registers are allocated to other code blocks. This limitation requires each code block to save and restore any extended registers that it uses, even when no other code block is using them. It would be desirable to implement an extended register set processor that addressed these limitations.

SUMMARY OF THE INVENTION

The identified objectives are addressed with an extended register processor according to the present invention. The processor includes a register file having a legacy register set and an extended register set. The extended register set includes a plurality of extended registers (sometimes referred to herein as the physical extended registers) that are accessible only by extended register instructions.

Extended register references in extended register instructions according to the preferred embodiment are virtual references, meaning that the processor maps the extended register reference to a physical extended register at run time. The processor includes a configurable extended register mapping unit to support this functionality. The mapping unit is accessible to an instruction decoder, which detects extended register references and forwards them to the mapping unit. The mapping unit returns a physical extended register corresponding to the extended register reference in the instruction. The mapping is alterable so that a virtual extended register reference in an instruction in a first code block maps to a first physical extended register while the same virtual extended register reference in an instruction in a second code block maps to a second physical extended register.

The processor supports an extended register allocation (XALLOC) instruction. An extended register allocation causes the processor to allocate a portion of the extended register set to the code block in which the declaration is located and to configure the mapping unit and supporting hardware to reflect the allocation.

In one embodiment, the extended register set is designed as a set of N banks of M registers per bank. Extended registers within a bank are allocated together. An extended register mask (XRM) having N fields is used to indicate the allocation status of the N banks of extended registers. Each XRM field may include 2 bits suitable for indicating one of four possible allocation states for the corresponding extended register bank: available (V), active (A), used by another code block (U), and global (G). The processor may save the current XRM as part of processing an extended register allocation. In addition, the processor supports a free extended register (XFREE) instruction that effectively reverses the effect of the extended register allocation instruction.

An XALLOC is preferably executed at the beginning of a code block and the XFREE instruction is executed at the end of the code block. In this manner, each code block has an extended register allocation and mapping that is insulated from any extended register allocation and mapping in other code blocks. If the processor contains sufficient extended registers to accommodate the extended register requirements of all concurrently executing code blocks, a unique portion of the extended register set is allocated to each code block. In this case, switching among the code blocks does not require saving the contents of any extended registers.

If, however, the extended register requirements of the active code block exhaust the current extended register availability, the processor is configured to detect this condition, as part of the XALLOC execution, and to free up sufficient extended register resources for the current code block by saving (to memory) the contents of sufficient extended registers. Before the code block terminates, the processor restores, as part of the XFREE execution, the extended registers that were saved. In this manner, the processor minimizes the number of registers that are saved during a context switch.

BRIEF DESCRIPTION OF THE DRAWINGS

Other objects and advantages of the invention will become apparent upon reading the following detailed description and upon reference to the accompanying drawings in which:

FIG. 8 illustrates selected portions of a code block suitable for use with the processor of FIG. 2 according to an embodiment of the present invention;

FIG. 10 is a flow diagram illustrating the execution of a extended register free instruction according to an embodiment of the present invention; and FIG. 11 is a block diagram of selected elements of an embodiment of a mapping unit for the present invention.

Figure 1:
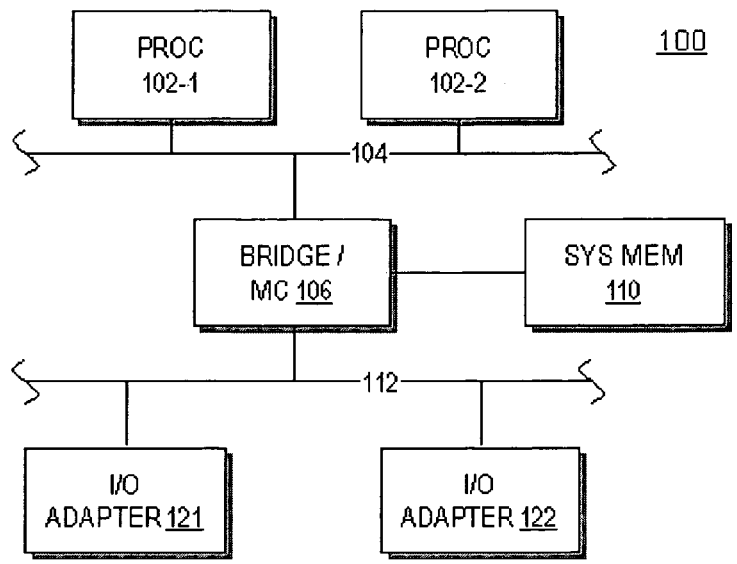
FIG. 1 is a block diagram of a data processing system according to an embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

The preferred embodiment described below encompasses an extended register set processor. The processor includes mapping hardware that maps virtual extended register references, contained in extended register instructions, to physical extended registers. The mapping hardware enables separately compiled code blocks to reference the extended register set without regard to the use of extended registers by other code blocks.

An extended register allocation instruction is included in code blocks that use extended registers. An extended register mask (XRM) indicates the status of the extended registers as available, used, global, and so forth. When an extended register allocation is processed, the XRM register is consulted to determine which, if any, extended registers are available to the currently executing code block. Based on the availability of extended registers, the mapping hardware is set so that extended register references in the active code block are mapped to available extended registers. When the processor decodes an extended register instruction, it uses the mapping hardware to resolve or map the extended register reference in the instruction to a physical extended register. As an example of the benefit provided by the mapping hardware, first and second code blocks that are separately compiled and otherwise independent, may both include instructions that reference a virtual extended register X0. The mapping hardware, however, maps the first code block's X0 reference to a first physical extended register while the second code block's X0 reference is mapped to a second physical extended register.

In addition, the preferred embodiment includes the ability to determine when extended register resources have been exhausted. If a code block includes an extended register allocation that exceeds the availability of the processor's extended registers, the XRM register will convey this "overflow" condition. One or more extended registers allocated to another code block will then be saved to memory to free the corresponding registers for the currently executing code block. In this manner, extended register states are saved to memory only when the extended register resources are exhausted. When sufficient extended registers exist to accommodate all active code blocks, context switching from one code block to another does not require saving any extended register state.

Referring now to the drawings, FIG. 1 depicts selected elements of a data processing system 100 including one or more general purpose processors 102-1 and 102-2 (generically or collectively referred to herein as processor(s) 102) according to an embodiment of the present invention. The number of processors 102 is an implementation detail and other systems may include more or fewer processors 102.

Processors 102 are connected to a proprietary, shared bus referred to herein as host bus 104. Processors 102 may be compatible with commercially distributed processors including, as examples, the PowerPC® family of processors from IBM Corporation. A bus bridge/memory controller unit 106 provides an interface between processors 102 and a system memory 110. In addition, unit 106 provides an interface between host bus 104 and a peripheral bus 112. Peripheral bus 112 is preferably compliant with an industry standard peripheral bus such as the PCI (Peripheral Components Interface) or the PCI-X busses. Although FIG. 1 depicts a single peripheral bus 112, those familiar with microprocessor-based system design will appreciate that bus 112 may include one or more subordinate bus bridges that provide any number of peripheral busses.

System 100 as depicted in FIG. 1 includes one or more I/O adapters 121 and 122. I/O adapters 121 and 122 provide I/O functionality to system 100. Adapters 121 and 122 may include, as examples, disc controllers, video adapters, network communication adapters, and so forth. In addition, depending upon the application and implementation of system 100, the I/O adapters represented by reference numerals 121 and 122 may include adapters for a keyboard and mouse.

Figure 2:
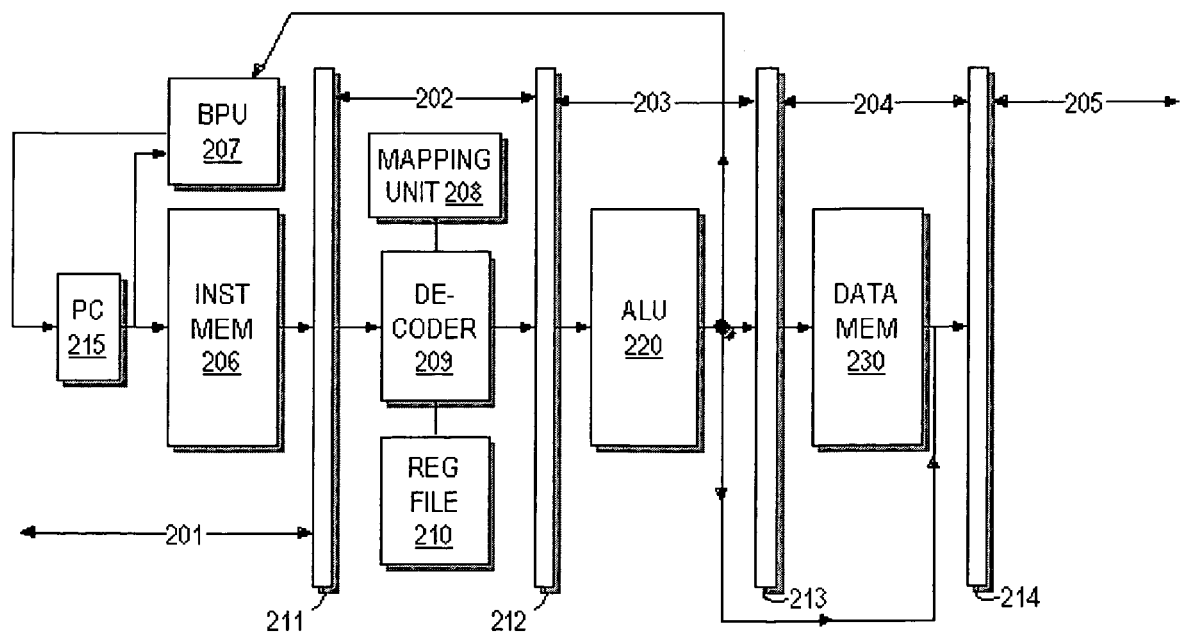
FIG. 2 is a block diagram of selected elements of a processor of FIG. 1.

Referring now to FIG. 2, a block diagram illustrating selected features of data processing system 100 is presented. In the depicted embodiment, processor 102 is a pipelined processor that includes a series of pipeline stages. The pipeline stages of the embodiment depicted in FIG. 2 include an instruction fetch (IF) stage 201, an instruction decode (ID) stage 202, an execution stage (EX) 203, a memory access (MEM) stage 204, and a write back (WB) stage 205. Each adjacent pair of pipeline stages is demarcated by a corresponding one of the pipeline registers 211 through 214, namely, an IF/ID register 211, an ID/EX register 212, an EX/MEM register 213, and a MEM/WB register 214. Other embodiments of processor 102 may employ more or fewer pipeline stages. The stages identified in FIG. 2 are well known. See, e.g., Hennessy and Patterson, *Computer Architecture a Quantitative Approach*, 132–38. (2d ed. Morgan Kaufmann 1996).

In the depicted embodiment, the ID stage 201 includes a program counter register 215 that generates the address of the next instruction to be executed. The address generated by the program counter register 215 is provided to an instruction memory (preferably implemented as an instruction cache) 206 and to a branch processing unit BPU 207. BPU 207 determines the address of a subsequent instruction to be executed and provides it to PC register 215.

Instruction memory 206 retrieves an instruction based on the address provided from PC register 215 and stages the instruction in IF/ID pipeline register 211. The instruction decode stage 202 of processor 102 includes an instruction decoder 209, a register mapping unit (mapper) 208, and a register file 210. Instruction decode stage 202 is responsible for determining the operation code (op code) of an instruction, retrieving operand values for the instruction, and storing the operand values in appropriate register locations. The depiction embodiment of execution stage 203 includes an arithmetic logic unit 220 that receives operand values from ID stage 202 and performs an operation on the operands. Memory access instructions (e.g., load/store instructions) require a memory access stage 204 in which a data memory 230 is accessed to load a memory value into a register or to store a register value to data memory 230. Finally, the WB stage 205 is included to write register values back to register file 210 at the completion of an operation.

The depicted embodiment of processor 102 includes features that facilitate the implementation of extended registers within register file 210. For any commercially distributed processor family, the available register set is defined and documented when the processor is first distributed. This register set may be referred to herein as the legacy register set. The PowerPC® family of processors, for example, includes a legacy register set of 32 general purpose registers. Generally speaking, a processor's instruction set reflects the number of registers in the legacy register set. As an example, an instruction set for a processor having 32 general purpose registers will likely include a first 5-bit field identifying a first operand and possibly a second 5-bit field identifying a second operand.

Instruction length is conserved by using the minimum number of required bits in each field. Thus, for a $2^N$ register processor, the instruction fields used to designate general purpose registers are confined to N bits. Shorter instructions are generally desirable because they require less storage space and, as a result, less transfer time.

While instruction length minimization is desirable, it also deters extended register implementations. Specifically, if an instruction set includes a minimum number of bits needed to address only the legacy register set, additional registers (extended registers) cannot be addressed without altering the instruction set. To address this problem, processor 102 according to one embodiment of the present invention includes an extended register set that is addressed through an instruction set extension such as instruction prefixes. Other embodiments may use an alternative mechanism to address the extended register set. The present invention does not prescribe the mechanism for addressing the extended register set.

As depicted in FIG. 2, however, processor 102 according to the present invention includes features that facilitate the implementation of extended registers, especially in the context of a multitasking environment. Specifically, as depicted in FIG. 2, processor 102 includes an instruction decoder 209 and an extended register mapper 208 that work in conjunction with a register file 210 that includes an extended register set (depicted in FIG. 3). The instruction decoder 209 is configured to detect an extended register instruction and to use extended register mapper 208 to resolve extended register references in the extended register instruction by mapping the extended register reference to physical extended registers.

An extended register instruction supported by processor 102 includes one or more virtual extended register references. Mapper 208 converts virtual extended register references to physical extended registers. An implementation of mapper 208 is described below with respect to FIG. 11. By mapping virtual extended register references to physical extended register references, mapper 208 permits programmers to code their applications using virtual extended register references so that, for example, each application or code block may refer to a virtual extended register 0 (X0). When two or more code blocks containing such references are concurrently active, mapper 208 will map references to X0 made by a first application to a first physical extended register while mapping references to X0 made a second application to a second physical extended register. This mapping functionality frees programmers from having to worry about the run-time availability or allocation of extended registers.

Figure 3:
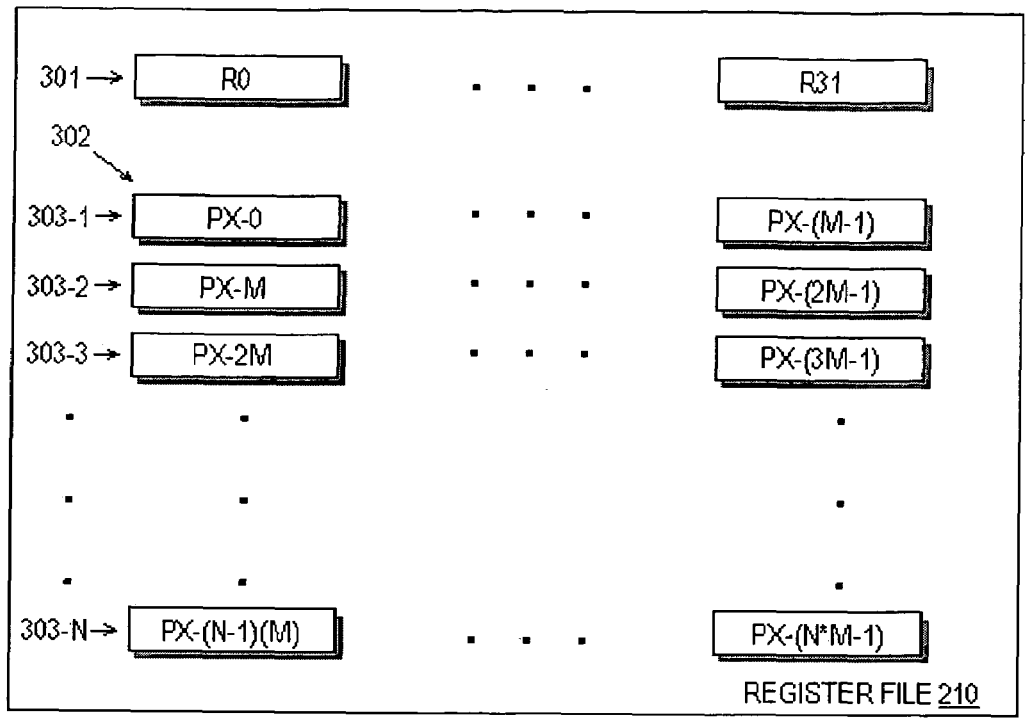
FIG. 3 illustrates an embodiment of an extended register file of the processor of FIG. 2.

Referring now to FIG. 3, a register file 210 according to one embodiment of the present invention is presented. In the depicted embodiment, register file 210 includes a legacy register set 301 and an extended register set 302. In the depicted embodiment, legacy register set 301 includes a set of 32 registers identified as R0 through R31. Other implementations may include more or fewer registers in their respective legacy register sets. The extended register in extended register set 302 is not accessible via the legacy instruction set for processor 102.

The depicted implementation of extended register set 302 is arranged in N banks of extended registers where each bank of registers includes M extended registers. The banks of registers are indicated by reference numerals 303-1 through 303-N (generically or collectively referred to as extended register bank(s) 303). Thus, a first bank of extended registers 303-1 includes physical extended registers PX0 through PX31 (for the case where M=32), a second bank of extended registers 303-2 includes physical extended registers PX32 through PX63, and so forth.

In one embodiment, the extended registers in register file 210 are allocated to code blocks in banks of registers. In this embodiment, a code block can declare any number of extended register banks (subject only to the number of extended banks N in processor 102). The allocation status of extended registers is maintained per extended register bank so that all extended registers within an extended register bank 303 have the same allocation status. In one embodiment, the allocation status of the extended registers is maintained in a special purpose register referred to herein as the extended register mask (XRM).

Figure 4:
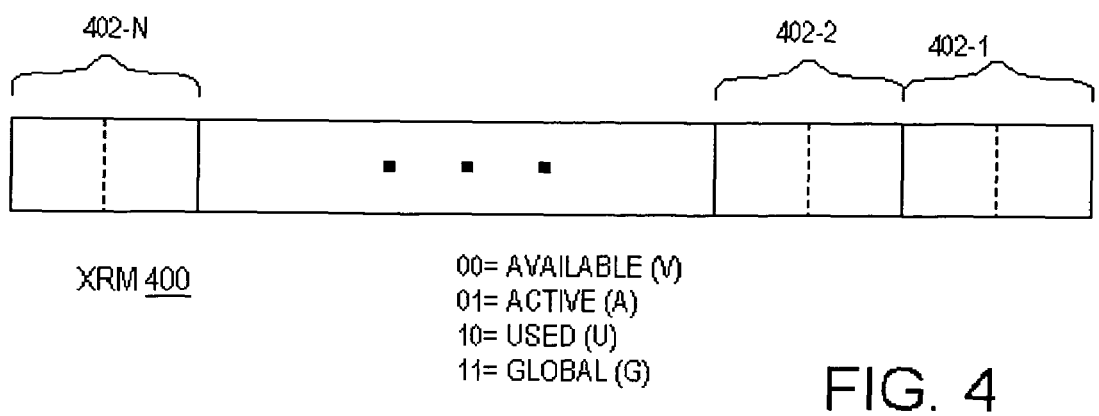
FIG. 4 illustrates an embodiment of an extended register mask for the extended register file of FIG. 3.

Referring now to FIG. 4, an exemplary XRM 400 is depicted. In the depicted embodiment, XRM 400 includes N 2-bit fields 402-1 through 402-N. Each field 402 indicates the status of a corresponding bank 303 of extended registers in register file 210 (FIG. 3). Each 2-bit field 402 is used to indicate the state of the corresponding bank 303 of extended registers as being either available (V), active (A), used (U), and global (G).

An available bank of registers is a bank of registers that has not been allocated to any code block. This is the initial state of all extended register banks 303. An active register bank is allocated by the current code block. A used bank of registers is a bank of registers that is allocated to a code block other than the currently active code block. Finally, a global bank of extended registers is a bank that is available to all active code blocks. The registers in a globally allocated extended register bank are not available for allocation to any individual code block.

Figure 5:
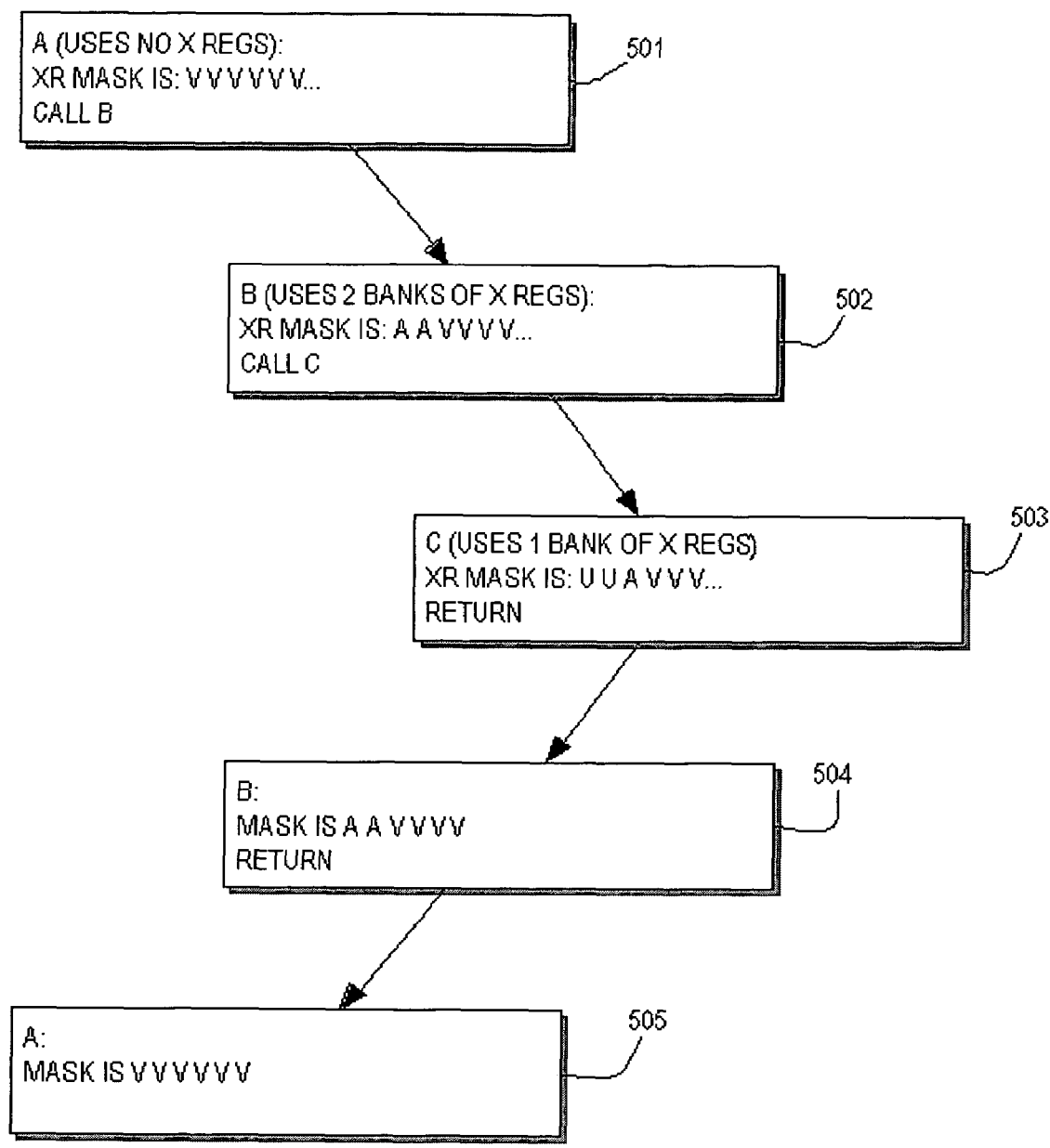
FIG. 5 is a conceptual illustration of an extended register allocation according to an embodiment of the present invention.

Referring now to FIG. 5, a conceptual block diagram illustrates the operation of processor 102 according to an embodiment of the present invention. The diagram of FIG. 5 emphasizes the allocation of the extended registers to various code blocks by processor 102. In the depicted example, a first code block (code block A) is executing (501). Code block A does not declare or otherwise use any extended registers. Moreover, no extended registers have been allocated to any other code blocks when code block A begins to execute. Thus, the value of XRM 400 is indicated as being V V V V V V . . . meaning that each 2-bit field 402 of XRM 400 contains the value "V." Code block A, as indicated in FIG. 5, includes a call to a second code block referred to as code block B.

Code block B, as indicated by reference numeral 502, declares or requests two banks of extended registers. Processor 102 allocates the first two available banks of registers (banks 303-1 and 303-2 of FIG. 3) to code block B and alters the state of XRM 400 to indicate that the first two banks of registers are allocated to code block B by storing the value "A" in the first two 2-bit fields 402-0 and 402-1 of XRM 400. Code block B may include instructions that refer to extended registers. These extended register references are mapped by processor 102 to physical registers in extended registers banks 303-1 and 303-2. Eventually, as indicated in FIG. 5, code block B executes a call to a third code block, code block C.

As indicated at reference numeral 503, code block C uses one bank of extended registers. When code block C declares this one bank of extended registers, processor 102 refers to XRM 400 and determines that the first two banks of registers are previously allocated (to code block B). The processor modifies the value in the first two fields 402 of XRM 400 from "A" to "U" to indicate these first two register banks are allocated to or being used by a code block other than the currently active code block. The processor also determines by referring to XRM 400 that there are sufficient remaining available banks of extended registers to accommodate the one bank of extended registers declared by code block C. Accordingly, processor 102 then allocates the first available bank of registers to code block C and indicates this allocation by modifying the value of field 402-2 of XRM 400 from "V" to "A." It is important to note that this description of FIG. 5 is a description of a specific implementation and that the invention alternative implementations are encompassed within the invention.

The example depicted in FIG. 5 thus depicts a case in which sufficient extended register banks are available to accommodate all of the active code blocks. In this case, none of the physical extended registers allocated to one code block are affected by the operation of another code block. For example, none of the physical extended registers modified by code block B (the extended registers in extended registers banks 303-0 and 303-1) are affected by code block C. Thus, when code block B calls code block C and a context switch takes place, the context switch does not need to save the state of code block B's extended registers, because processor 102 allocates a different bank of extended registers to code block C and code block C, therefore, will not alter the contents of code block B's extended registers.

When code block C completes its execution, it executes a return. Upon returning to code block B (504), code block B restores the XRM register to the value that it contained when the switch to code block C occurred. As described below with respect to the embodiment of mapping unit 208 described in FIG. 11, the configuration of mapping unit 208 may rely partially or entirely on the value in XRM 400. In such cases, restoring XRM register 400 may also effectively restore mapping unit 208. Other implementations may save and restore XRM register 400 and mapping unit 208 as distinct operations. References in this disclosure describing saving or restoring XRM register 400 and mapping unit 208 are intended to encompass both such implementations. After restoring the state of XRM 400 and the mapping unit, code block B is free to issue extended register references and the references will be interpreted in the same manner as they were interpreted prior to the switch to code block C. In a similar fashion, code block B eventually executes a return to code block A (505). Upon returning to code block A, the XRM register and mapping unit are restored to the same states that they had when code block B was called.

Figure 6:
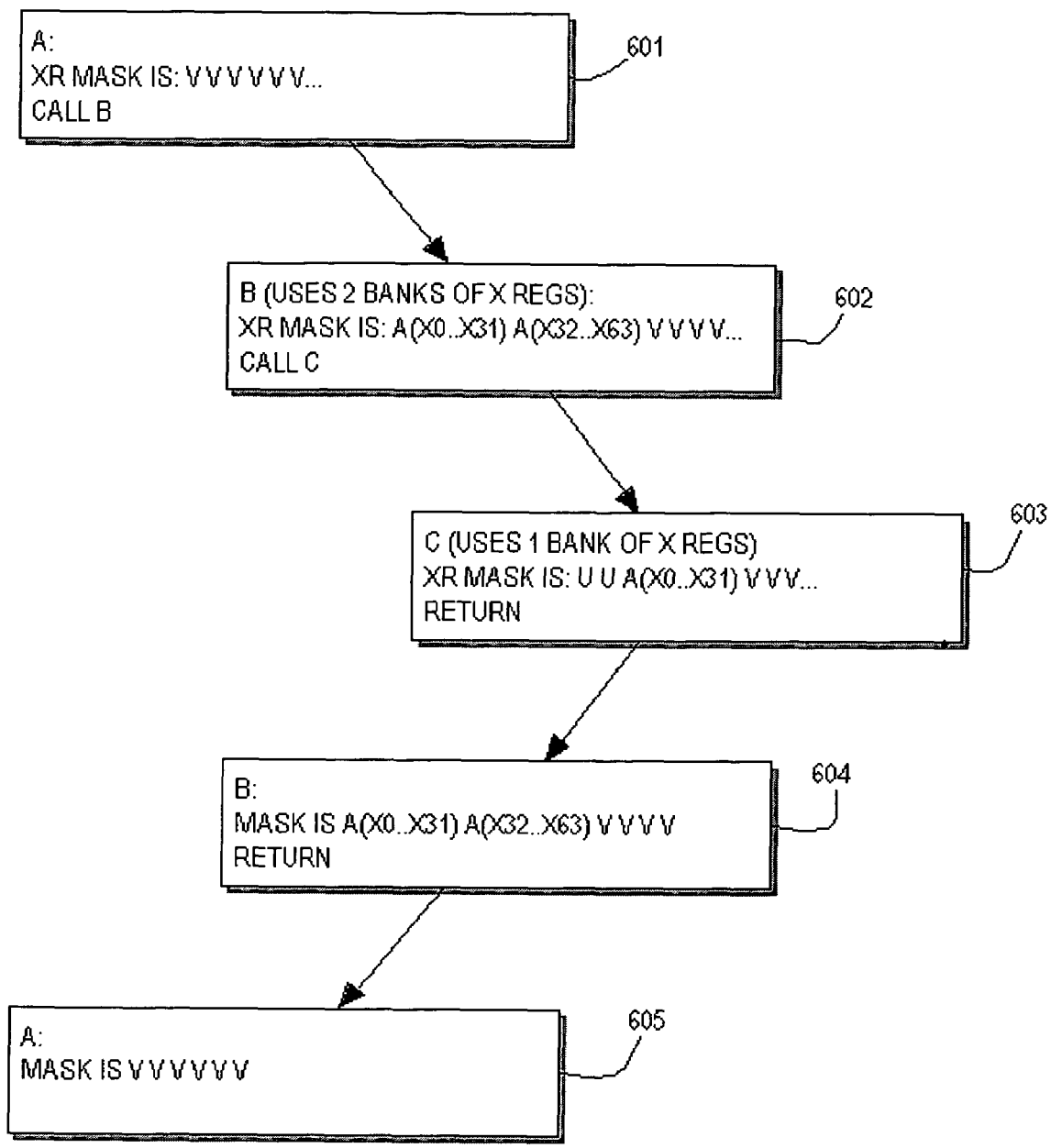
FIG. 6 is a conceptual illustration of an extended register allocation use according to the present invention emphasizing virtual extended register referencing.

Referring now to FIG. 6, a second example of the operation of processor 102 is presented to emphasize a virtual naming feature of the extended register support provided by processor 102 of the present invention. In FIG. 6, as in FIG. 5, a code block A executes (601) and calls a code block B. Code block B executes (602) and calls code block C. Code C executes (603) and returns to code block B. Code B then returns (604) to code block A. Code block A completes (605) and finishes. Code block A does not use extended registers, but code block B uses two banks of extended registers while code block C uses one bank of extended registers. The processor has sufficient extended register banks to accommodate block B and block C.

Figure 7:
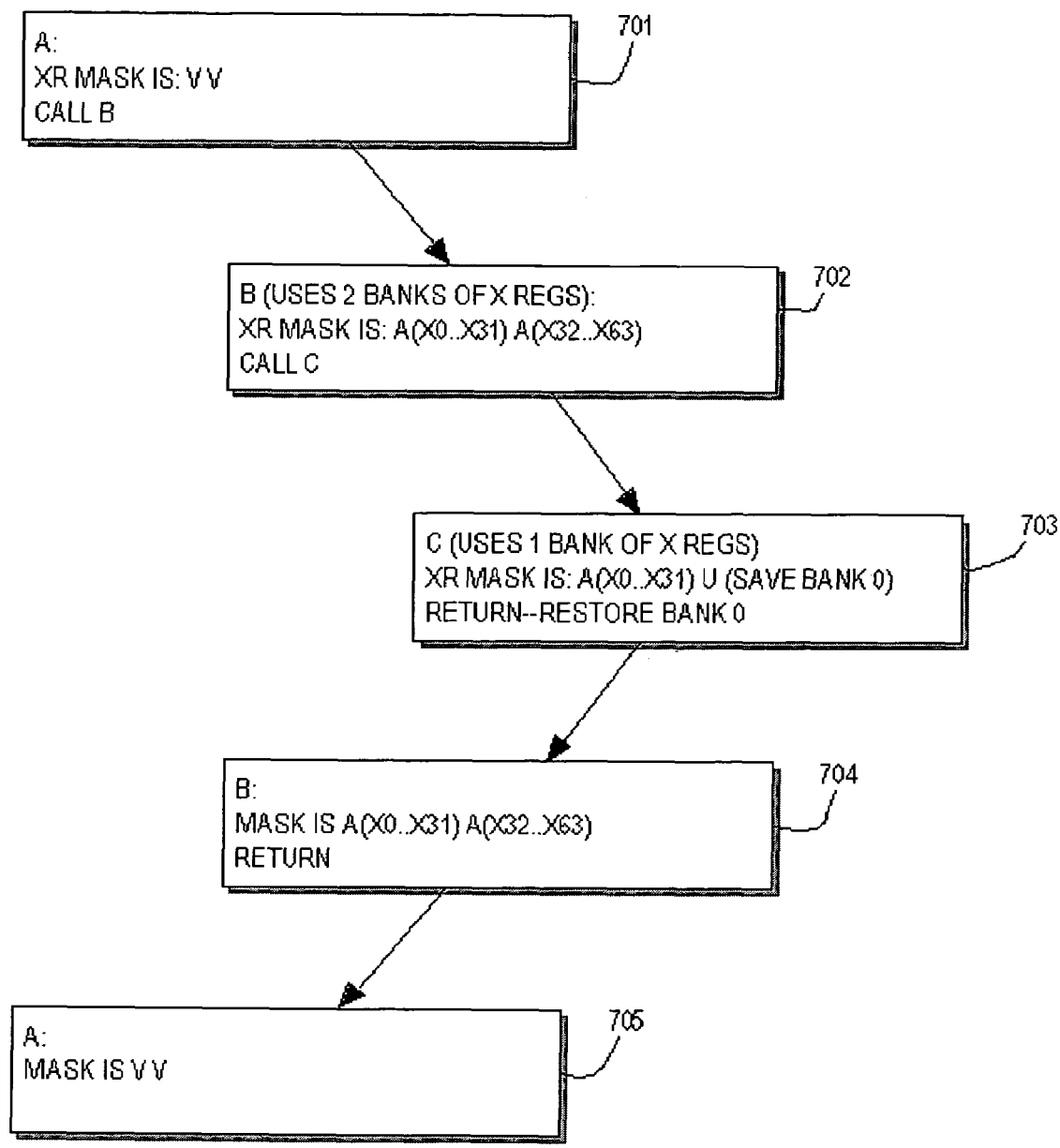
FIG. 7 is a conceptual illustration of an extended register implementation emphasizing overflow handling when all extended registers have been allocated.

As depicted in FIG. 6, code block B may include instructions containing virtual references to extended registers X0 through X63. These virtual references are mapped to the physical extended registers in extended register banks 303-1 and 303-2 (i.e., physical extended registers PX-0 through PX-63 of FIG. 3 where M=32). Like code block B, code block C also contains virtual references to extended registers X0 through X31, but these virtual references are mapped to the physical extended registers in extended register bank 303-3 (i.e., PX-64 through PX-95). Thus, virtual references in code block B to extended register 0 (X0) are mapped to physical extended register PX-0 while virtual references to X0 in code block C are mapped to physical extended register PX-64. This virtual naming functionality is desirable for supporting independently developed code blocks that can reference the extended register set without knowledge of the manner in which other code blocks are using the extended registers. Referring now to FIG. 7, the example of FIG. 6 is modified to illustrate the overflow or exhaustion functionality of the preferred embodiment of processor 102. FIG. 7 depicts a sequence 701 through 705 that is analogous to sequence 601 through 605 of FIG. 6. The processor on which sequence 701 executes, however, does not contain sufficient extended register banks to accommodate all extended register banks simultaneously. Specifically, in the depicted illustration, processor 102 includes only two extended registers banks. When code block B executes (702) and declares two extended register banks, the extended register bank is modified from V V (the value of XRM 400 when code block B begins to execute) to A A indicating that both banks of extended registers are in use. When code block B then calls code block C, and code block C declares its requirement for a single extended register bank, an overflow condition occurs because there are no available extended register banks to fulfill the declaration by code block C. Under these circumstances, processor 102 according to the present invention recognizes the overflow condition and determines how many extended register banks are required to fulfill the request of the currently executing code block. The processor then makes a sufficient number of extended register banks available by saving the content of one or more extended register banks to memory.

This process is denoted in block 703 of FIG. 7. Specifically, code block C requires one bank of extended registers, but none are available. Processor 102 frees up one of the extended register banks for use by code block C by writing the contents of the extended register bank to memory. In the implementation depicted in FIG. 7, the first extended registered bank (extended register bank 0) is saved to memory thereby making it available to code block C. The contents of the second extended register bank are preserved for use by code block B when code block C ultimately returns to code block B. Block 703 also indicates that, upon returning to code block B, code block C retrieves the extended register bank contents from memory and restores extended register bank 0 to the state it was in when code block B called code block C.

Figure 9:
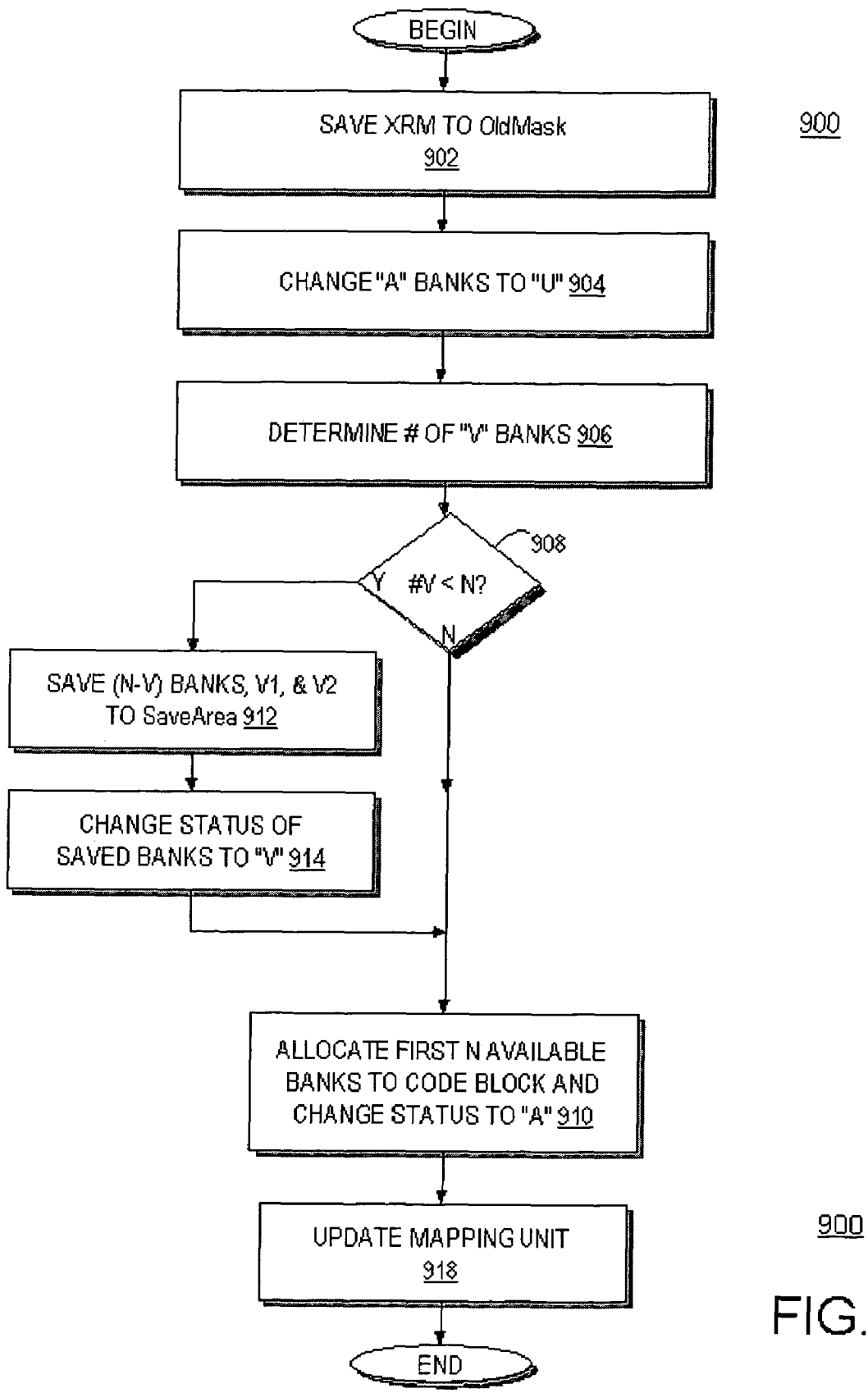
FIG. 9 is a flow diagram illustrating the execution of an extended register allocation instruction according to an embodiment of the present invention.

Having illustrated examples of the functionality of processor 102 according to the present invention, additional implementation details are presented in FIG. 8 through FIG. 10. In FIG. 8, a representative code block 800 for use in conjunction with a processor 102 according to the present invention is presented. The depicted embodiment of code block 800 incorporates an instruction informing processor 102 that the code block requires the use of extended registers. Specifically, the depicted embodiment of code block 800 includes an extended register allocation instruction 801. Extended register allocation instruction 801 is identified by the pneumonic XALLOC. The depicted illustration of the XALLOC instruction includes three parameters, namely, N, OldMask, and SaveArea. For the implementation of extended registers depicted in FIG. 3, the parameter N is an integer value indicating the number of extended register banks required by code block 800. In other implementations, N may indicate the number of required extended registers (rather than extended register banks).

The OldMask parameter identifies a register or memory location where the existing value of XRM 400 (FIG. 4) is stored. Storing the existing value of XRM 400 at the beginning of code block 800 enables processor 102 to restore XRM 400 upon returning to its parent code block. The SaveArea parameter points to a buffer where any extended registers that need to be saved prior to executing the remainder of code block 800 are saved. As indicated above, the SaveArea buffer is used when a code block requests one or more extended register banks and the supply of available extended register banks is exhausted.

Referring to FIG. 9, a flow diagram 900 illustrating the operation of the XALLOC instruction 801 of code block 800 according to one embodiment of the invention is depicted. Initially, the XALLOC instruction causes processor 102 to store (block 902) the value of XRM 400 (FIG. 4) to the register or memory location identified by the OldMask parameter. XALLOC then modifies (block 904) the XRM by changing any banks having an "A" allocation status to "U," thereby indicating that the corresponding banks are allocated to another code block.

The XALLOC instruction then causes processor 102 to determine (block 906) the number of extended register banks available to the current code block by evaluating the contents of XRM 400 (i.e., count the number of XRM fields 402 having a value of "V").

Supporting the extended register exhaustion functionality requires processor 102 to then determine (block 908) whether the number of extended register banks indicated in the XALLOC instruction (N) exceeds the number of available extended register banks (#V). If #V is less than N, one or more of the allocated extended register banks must be freed up and made available to the current code block. Processor 102 thus saves (block 912) one or more banks of extended registers to a memory location pointed to by the SaveArea parameter.

In an embodiment desirable for allocating extended memory banks to code blocks in contiguous "chunks", the extended register banks chosen for saving to memory are the highest allocated banks (i.e., the allocated memory bank(s) 303-X (FIG. 3) having the highest value of X). Thus, for an example in which banks 303-1 through 303-3 have been allocated and the current code block requires, in addition to any available banks, two of the three previously allocated banks, the preferred implementation of processor 102 selects banks 303-3 and 303-2 as the banks that it will save to memory.

In the depicted embodiment, processor 102 also stores a pair of values when extended memory banks are saved to memory. A first value (V1) indicates how many banks were saved and the second value (V2) indicates the identity of the lowest bank number that was saved. Continuing with the example in the preceding paragraph, V1 would be equal to 2 because two banks were saved to memory and V2 would also be equal to 2 because extended register bank 303-2 was the lowest bank saved to memory. When processor 102 eventually restores the saved data to the extended register banks, V1 and V2 will enable processor 102 to restore the saved data to the correct extended register banks.

Upon saving the required number of extended register banks to memory, processor 102 then changes the status of those banks to "V" because the banks are now available for allocation. Processor 102 then allocates (block 910) the available banks to the current code block and writes an "A" status the XRM for each bank allocated. The allocation process is simpler if there are sufficient available extended register banks to satisfy a code block's declaration. If, in block 908, the number of banks (N) indicated in the allocation statement is not greater than the number of available (#V) banks, processor 102 allocates (block 910) the first N available banks to the code block and alters the XRM to indicate the allocated code banks with the allocation status "A".

In addition to saving the old value of XRM 400, modifying the contents of XRM, and saving extended registers to memory when needed, the XALLOC instruction updates (block 918) mapping unit 208 to reflect the allocation of extended register banks to the current code block so that virtual references to extended registers are properly mapped to their corresponding physical registers. As indicated previously, the mapping produced by mapping unit 208 may depend partially or entirely on the value of XRM 400. In such cases, updating XRM 400 inherently causes updating of mapping unit 208.

Referring to FIG. 11, selected elements of an embodiment of mapping unit 208 are depicted. The depicted embodiment is suitable for use in an implementation, such as the implementation described above with respect to FIG. 9, that allocates extended register banks in contiguous portions.

When a code block's extended registers are allocated in contiguous extended register banks, the mapping of virtual extended register references to physical extended registers is achieved by determining an offset value and adding the offset value to the value in the virtual reference. The depicted embodiment of mapping unit 208 includes an offset unit 152 that is able to access XRM 400. Offset unit reads XRM 400 and determines the lowest extended register bank allocated to the current code block (i.e., the lowest extended register banks having a status of "A"). Offset unit 152 then determines an offset by multiplying the number of extended registers (M) in each bank by X-1 where X is the bank number of the lowest allocated register bank. As an example, an allocation of banks 303-3 and 303-4 (FIG. 3) to a code segment in an embodiment where each extended register bank 303 has 32 registers produces an offset value of 64 (X=3, M=32).

Virtual references are then resolved by adding the virtual register number to the offset. Mapping unit 209 as depicted in FIG. 11 includes an adder 154 that adds the value of the virtual reference (indicated in FIG. 11 by reference numeral 156) to the offset provided by offset unit 152. In the illustrated example the virtual reference 156 is to virtual register X1, which is associated with the value 1. The 1 is added to the offset of 64 to produce a physical extended register address of 65. Thus, under the mapping depicted in FIG. 11, a reference, such as the reference contained in the extended register load instruction 805 (FIG. 8) to virtual register X1 would map to physical extended register 65.

Code block 800 of FIG. 8 includes an XFREE instruction 810 at the end of the block. The XFREE instruction causes processor 102 to restore the extended register file to the state that it was in when code block 800 began. More precisely, the XFREE instruction restores only that portion of the extended-register state that the preceding code block (the code block that called code block 800) required. Referring to FIG. 10, a flow diagram 950 illustrates one embodiment of the execution of an XFREE statement by processor 102. In the depicted embodiment, processor 102 determines (block 952) whether any extended register banks were saved to memory when the current code block was initiated.

If code blocks were saved to memory (because the XALLOC statement indicated more extended register banks than were available), the XFREE statement retrieves (block 954) the saved data and stores the retrieved data in the appropriate extended register banks. Processor 102 determines the appropriate extended register banks referring to the V1 and V2 values described above with respect to the XALLOC instruction. Processor 102 then retrieves the data from OldMask and stores it back in XRM 400 so that the relevant portion of the extended register file is restored (block 956) to the state that it was in when the current code block was initiated. The XFREE instruction also restores (block 958), either explicitly or implicitly when XRM 400 is restored, mapping unit 208 to reflect the allocation of extended register banks to the prior code block so that virtual references to extended registers are properly mapped to their corresponding physical registers when the prior code block resumes control. It is significant that, when an XALLOC instruction does not cause processor 102 to save any extended registers to memory (because sufficient extended register banks were available), the XFREE instruction does not affect the contents of any extended registers.

It will be apparent to those skilled in the art having the benefit of this disclosure that the present invention contemplates an extended register processor that supports efficient, run-time allocation of extended registers. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. An extended register processor, comprising:
   a register file including a legacy register set and an extended register set comprising a plurality of physical extended registers arranged in N banks with M registers per bank, wherein the extended register set is accessible only with an extended register instruction;
   an instruction decoder enabled to detect an extended register instruction containing a virtual reference to an extended register;
   an extended register mapping unit, accessible to the instruction decoder, enabled to map the virtual reference to one of the physical extended registers; and
   means for processing an extended register allocation instruction in a code block by allocating a portion of the extended register set to the code block and configuring the extended register mapping unit to reflect the allocation, wherein the means for processing the extended register allocation instruction includes means for modifying an extended register mask, wherein the mask includes N fields each indicating the allocation status of a respective one of the extended register banks.

2. The processor of claim 1, wherein the means for processing the extended register allocation instruction includes means for determining that at least some of the extended registers needed to fulfill the allocation have been previously allocated and, responsive thereto, means for saving the contents of selected extended registers to make the selected registers available to fulfill the allocation.

3. The processor of claim 2, further comprising means for processing an extended register free instruction in a code block by restoring the selected registers with the saved contents.

4. The processor of claim 1, wherein the allocation status of each of the extended register banks has one of a plurality of possible states including available, active, used, and global, wherein the available status indicates that the extended register bank is available for allocation to the code block, the active status indicates that the extended register bank is allocated to the code block, the used status indicates that the extended register bank is allocated to another code block, and the global status indicates that the extended register bank is allocated globally.

5. The processor of claim 1, wherein the means for processing the extended register allocation includes means for saving the state of the extended register mask.

6. The processor of claim 5, further comprising means for processing an extended register free instruction in a code block by restoring the extended register mask with the saved state.

7. A processor, comprising:
   a plurality of physical extended registers accessible only via extended register instructions;
   means for processing an extended register allocation instruction in a first code block by making a first physical extended register available for use within the first code block and setting a first mapping between a particular virtual extended register and the first physical extended register;

means for processing a first extended register instruction in the first code block including means for mapping a reference to the particular virtual extended register to the first physical extended register based on the first mapping, wherein said first physical extended register has a particular value following processing of the first extended register instruction;

means for processing an extended register allocation instruction in a second code block by making a second physical extended register available for use within the second code block and setting a second mapping between the particular virtual extended register and the second physical extended register, wherein the second physical extended register is different from the first physical extended register; and means for processing a second extended register instruction in the second code block in a different context than the first code block, said means for processing the second extended register instruction including means for mapping a reference to the particular virtual extended register to the second physical extended register based on the second mapping, wherein processing of the second code block leaves the particular value unaltered in the first physical extended register.

8. The processor of claim 7, wherein the means for processing the extended register allocation instruction in the second code block includes means for saving the first mapping.

9. The processor of claim 8, further comprising means for processing an extended register free instruction in the second code block including means for restoring the first mapping.

10. The processor of claim 7, wherein the means for processing the extended register allocation instruction in the second code block includes means for saving the contents of an extended register allocated to the first code block.

11. The processor of claim 10, wherein the means for saving the contents of the extended register allocated to the first code block is invoked only if the number of extended registers indicated in the extended register allocation in the second code block exceeds the number of available extended registers.

12. A processor, comprising:
a register file including a legacy register set and an extended register set comprising a plurality of physical extended registers, wherein the extended register set is accessible only with an extended register instruction;
an instruction decoder configured to detect references to virtual extended registers;
mapping hardware to map the detected references to the virtual extended registers to various physical extended registers in the extended register set;
an extended register mask indicative of the allocation status of the plurality of physical extended registers;
means for executing a first code block and a second code block each including at least one extended register instruction;
register allocating means for allocating a first portion of the extended register set to a first code block and for allocating a second portion of the extended register set to a second code block executed in a different context, wherein the register allocating means includes;
  means for determining by reference to the extended register mask whether sufficient physical extended registers are available for allocation to the second code block; and
  means, responsive to determining that sufficient physical extended registers are available for allocation to the second code block, for retaining allocation of the first portion of the extended register set to the first code block during execution of the second code block in the different context; and
  means, responsive to determining that insufficient physical extended registers are available for allocation to the second code block, for initiating a save operation in which contents of at least some of the physical extended registers in the first portion are saved from the extended register set to memory and for allocating at least some of the physical extended registers in the first portion as the second portion allocated to the second code block.

13. The processor of claim 12, wherein the extended register set includes a plurality of banks of physical extended registers, each bank comprising a plurality of the physical extended registers.

14. The processor of claim 12, wherein the mapping hardware establishes a first mapping between the virtual extended registers and the extended register set for the first code block and a different second mapping to map between the virtual extended registers and the extended register set for the second code block.

15. The processor of claim 14, wherein the processor is further enabled to save the first mapping and to restore the first mapping responsive to returning to the first code block from the second code block.

* * * * *